US012722507B2

(12) United States Patent
Shibata et al.

(10) Patent No.: US 12,722,507 B2
(45) Date of Patent: Sep. 1, 2026

(54) CHARGE PORT DEVICE FOR VEHICLE

(71) Applicant: Nissan Motor Co., Ltd., Kanagawa (JP)

(72) Inventors: Akiyoshi Shibata, Kanagawa (JP); Daisuke Ichiwara, Kanagawa (JP); Atsushi Takaki, Kanagawa (JP); Toshihiro Inoue, Kanagawa (JP); Ryohei Miyoshi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 869 days.

(21) Appl. No.: 17/754,707

(22) PCT Filed: Oct. 9, 2019

(86) PCT No.: PCT/JP2019/039835
§ 371 (c)(1),
(2) Date: Apr. 8, 2022

(87) PCT Pub. No.: WO2021/070284
PCT Pub. Date: Apr. 15, 2021

(65) Prior Publication Data

US 2024/0075824 A1 Mar. 7, 2024

(51) Int. Cl.
*B60L 53/16* (2019.01)
*B60K 15/05* (2006.01)
(Continued)

(52) U.S. Cl.
CPC .......... *B60L 53/16* (2019.02); *H01R 13/6683* (2013.01); *H01R 13/7172* (2013.01);
(Continued)

(58) Field of Classification Search
CPC . B60L 53/16; H01R 13/6683; H01R 13/7172; H01R 13/7175; H01R 2201/26;
(Continued)

(56) References Cited

U.S. PATENT DOCUMENTS 5,630,357 A * 5/1997 Akiyama ................ A23L 7/187 99/290
10,717,383 B2 7/2020 Ueno et al.
(Continued)

FOREIGN PATENT DOCUMENTS

JP 2012130189 A 7/2012
JP 5759971 B2 8/2015
(Continued)

*Primary Examiner* — Julian D Huffman
*Assistant Examiner* — Nathan J Instone
(74) *Attorney, Agent, or Firm* — Osha Bergman Watanabe & Burton LLP

(57) ABSTRACT

A charge port device includes a charge port provided in a port accommodation recess and a lid for concealing the port accommodation recess. A latch is provided in the port accommodation recess on an opposite side to a lid hinge with respect to the charge port. A slit is formed between a surface of a vehicle body and an outer circumferential edge of the lid while the lid is closed. A lamp is provided at a position in the port accommodation recess between the latch and the slit on an opposite side to the lid hinge with respect to the charge port and the position is not visible from outside while the lid is closed. Formed is a light-guiding reflection path that guides a light emitted from the lamp toward the above-mentioned slit as an indirect light by reflecting the light while the lid is closed.

7 Claims, 5 Drawing Sheets

(51) Int. Cl.
*H01R 13/66* (2006.01)
*H01R 13/717* (2006.01)

(52) U.S. Cl.
CPC ........ *B60K 15/05* (2013.01); *B60K 2015/053* (2013.01); *B60K 2015/0561* (2013.01); *H01R 13/7175* (2013.01); *H01R 2201/26* (2013.01); *Y02T 90/14* (2013.01)

(58) Field of Classification Search
CPC .............. B60K 15/05; B60K 2015/053; B60K 2015/0561; Y02T 90/14
USPC .......................................................... 320/109
See application file for complete search history.

(56) References Cited

U.S. PATENT DOCUMENTS

| | | | | |
|---|---|---|---|---|
| 2014/0176069 | A1* | 6/2014 | Ohtomo | H02J 7/0047<br>320/109 |
| 2015/0034400 | A1* | 2/2015 | Amano | B60L 50/66<br>180/65.8 |
| 2017/0182902 | A1* | 6/2017 | Katayama | H02J 7/00 |
| 2018/0334052 | A1 | 11/2018 | Hwang et al. | |
| 2019/0217772 | A1* | 7/2019 | Ueno | B60Q 1/323 |
| 2020/0190889 | A1* | 6/2020 | Jun | E05B 83/34 |

FOREIGN PATENT DOCUMENTS

| | | | |
|---|---|---|---|
| JP | 2018/043744 | A | 3/2018 |
| WO | 2018047582 | A1 | 3/2018 |

* cited by examiner

1(1L)
2
3
4
4a
4b
4c
4d
4e
5
6
6a
6b
7
10
F

1(1L)
5
8
9
10
4d
6b
4b
3
6
4c
6a
2
4
4a
F 5
2
10a
10
10b
P
9
4b
4d
4c
4

CHARGE PORT DEVICE FOR VEHICLE

TECHNICAL FIELD

The present invention relates to a charge port device for a vehicle.

BACKGROUND ART

A Patent Literature 1 listed below discloses a charge port device installed in a vehicle. The charge port device includes a charge port to which a charging cable is connected, and a lid for concealing the charge port. The lid is opened when the charging cable is to be connected to the charge port to charge a battery installed in the vehicle. The charge port device has a lamp near the charge port in order to make it easier to connect the charging cable to the charge port at a dark place. When the lid is closed, the charge port and the lamp are not visible from the outside.

PRIOR-ART LITERATURE

Patent Literature

Patent Literature 1: Japanese Patent Application Publication No. 2012-130189

SUMMARY OF INVENTION

Problem to be Solved by the Invention

Gasoline is usually refueled to a vehicle at a gas station provided with bright lamps. However, recharging is often done at a parking space of an ordinary household or at a charging station located in a corner of a public parking lot. Therefore, there is a case where charging have to be done in a dark place. In such a case, it may be difficult to find a lid of a charge port device when trying to open the lid. The charge port device disclosed in the above Patent Literature 1 illuminates the charge port when the lid is opened, so that it is difficult to recognize the position of the charge port when the lid is closed.

Therefore, it is an object of the present invention to provide a charge port device for a vehicle that can make it easy to recognize a position of its charge port.

Means for Solving the Problem

An aspect of the present invention provides a charge port device for a vehicle. The charge port device includes a charge port provided in a port accommodation recess and a lid for concealing the port accommodation recess. A latch is provided in the port accommodation recess on an opposite side to a lid hinge with respect to the charge port. A slit is formed between a surface of a vehicle body and an outer circumferential edge of the lid while the lid is closed. A lamp is provided at a position in the port accommodation recess between the latch and the slit on an opposite side to the lid hinge with respect to the charge port, and the position is not visible from outside while the lid is closed. Formed is a light-guiding reflection path that guides a light emitted from the lamp toward the above-mentioned slit as an indirect light by reflecting the light while the lid is closed.

Effect of the Invention

According to the aspect, a position of the charge port can be recognized easily by an indirect light led along a light-guiding reflection path(s) even while the lid is closed.

DESCRIPTION OF EMBODIMENTS

Hereinafter, a charge port device according to an embodiment will be described with reference to the drawings.

Figure 1:
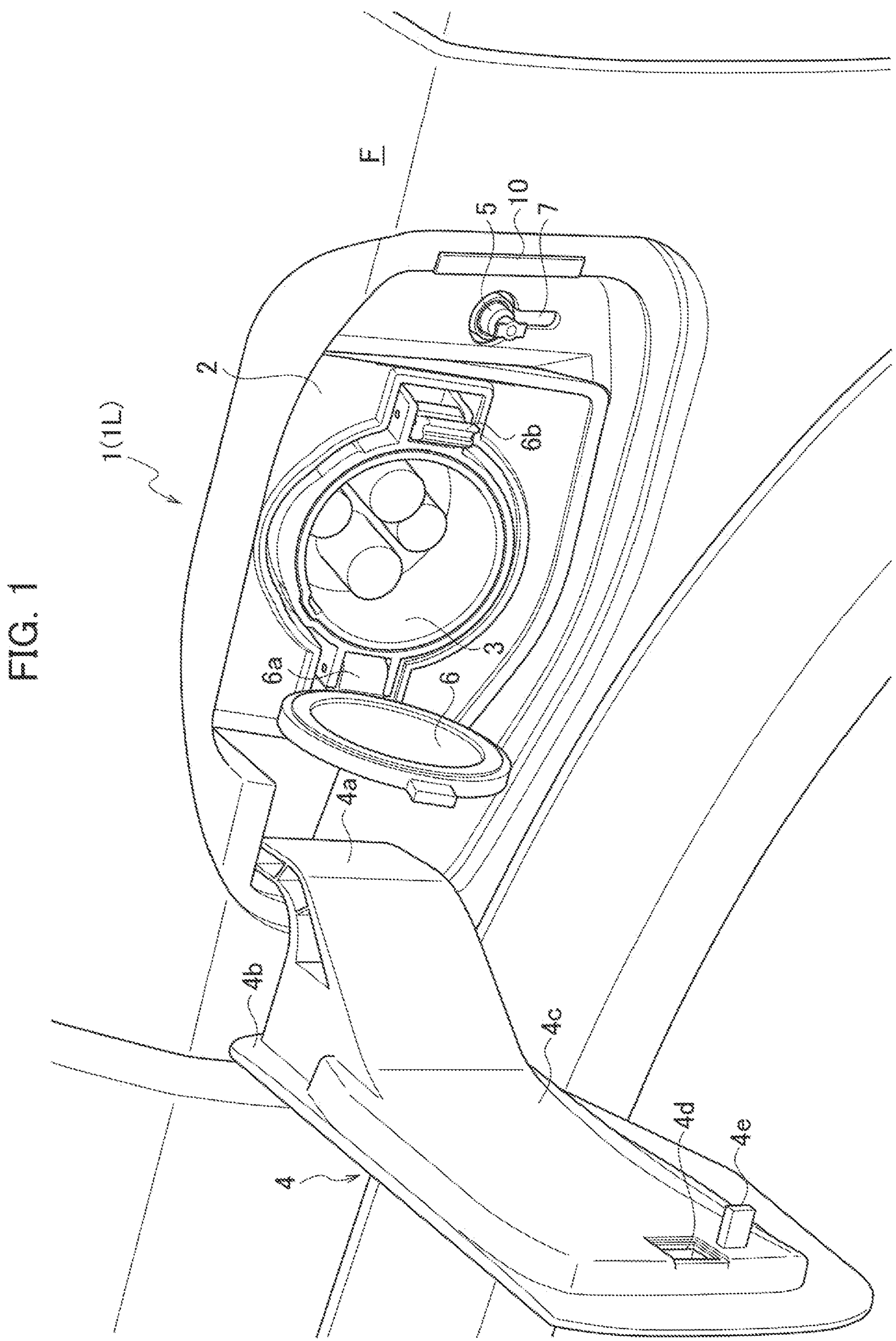
FIG. 1 It is a perspective view of a charge port device (its lid is open) according to an embodiment.
Figure 2:
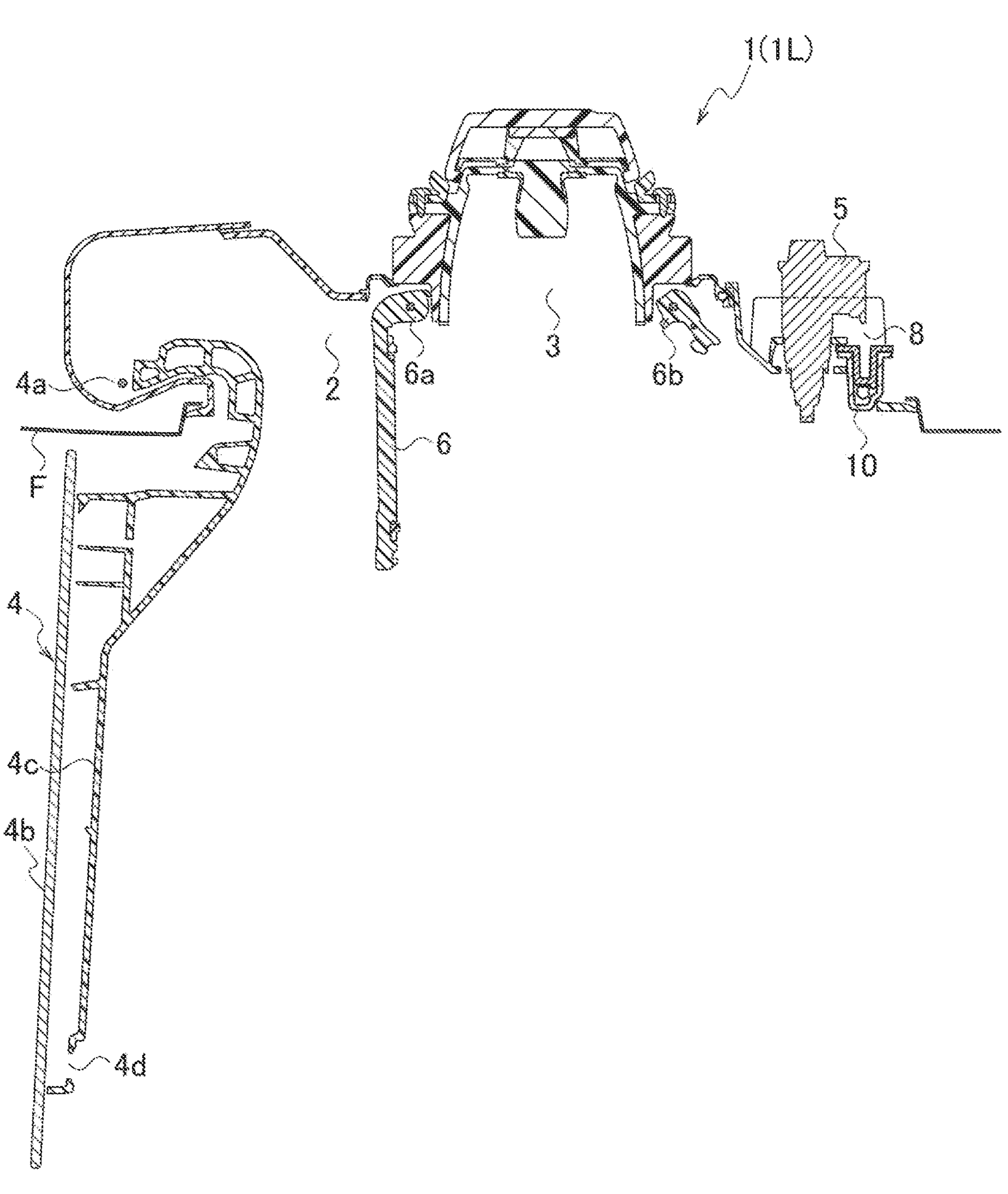
FIG. 2 It is a horizontally cross-sectioned view of the charge port device (the lid is open).
Figure 3:
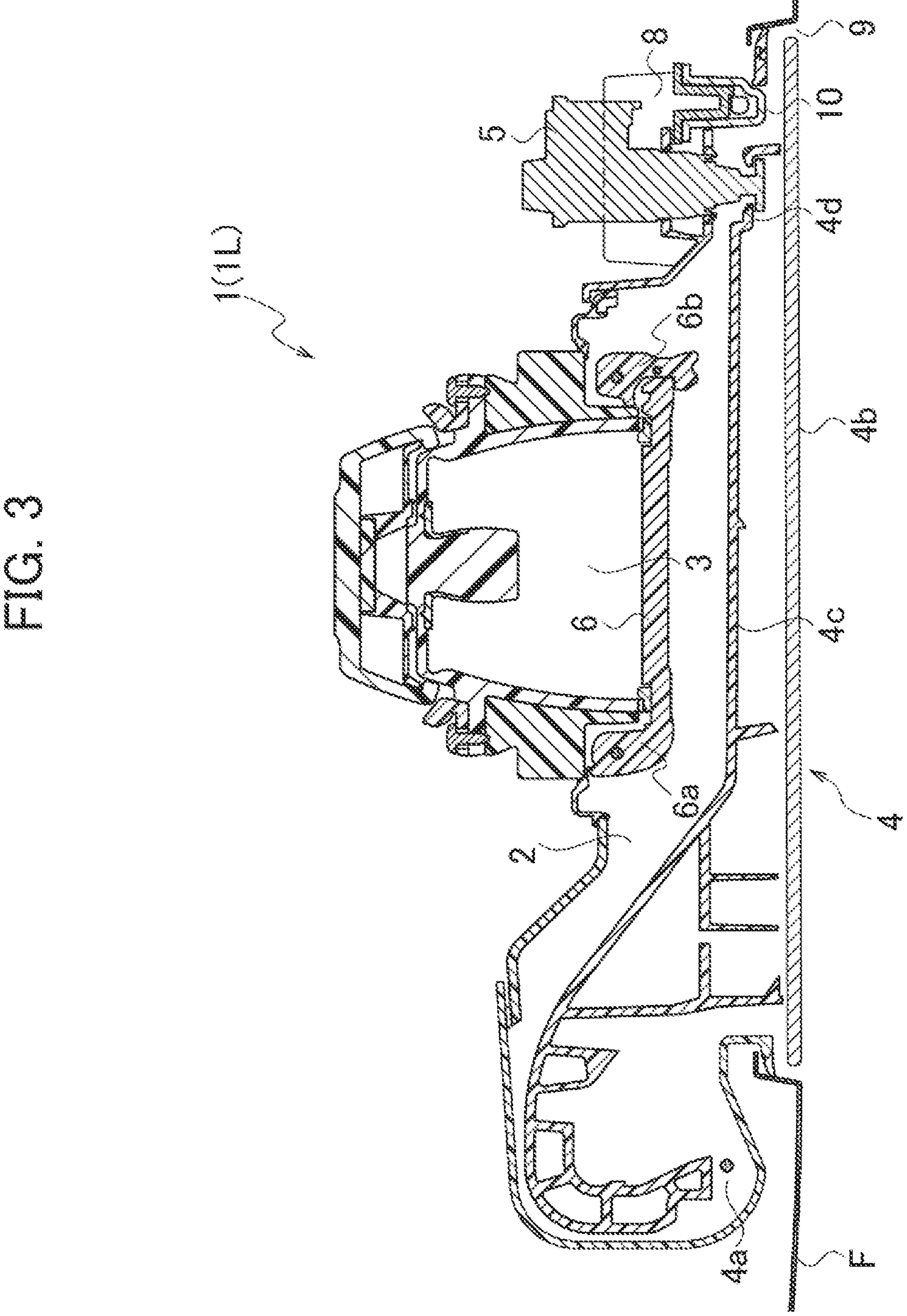
FIG. 3 It is a horizontally cross-sectioned view of the charge port device (the lid is closed).

As shown in FIG. 1 to FIG. 3, the charge port device 1 according to the present embodiment is provided on a left front fender F of a vehicle. The charge port device 1 includes a port accommodation recess 2 formed on a surface of a vehicle body (the left front fender F), a charge port 3 provided in the port accommodation recess 2, and a lid 4 attached to the vehicle body for concealing the port accommodation recess 2. The charge port device 1 also includes a lid hinge 4*a* attached to the vehicle body for supporting the lid 4 to be openable and closable, and a latch 5 provided in the port accommodation recess 2 on an opposite side to the lid hinge 4*a* with respect to the charge port 3 for keeping a closed state of the lid 4.

The lid 4 is configured of an outer panel 4*b* made of metal and a plastic part 4*c* attached on an inner side of the outer panel 4*b*. The lid hinge 4*a* is formed in the plastic part 4*c*, and located at a front portion in the port accommodation recess 2. The latch 5 provided at a rear portion of the port accommodation recess 2 is a so-called push latch, and its latching/unlatching can be electronically locked. The lid 4 is still closed after the latch 5 is only unlocked. When the latch 5 is pushed by pressing the closed lid 4, the lid 4 lifts up and then becomes half open (unlatching). This half-opened lid 4 is fully opened after its edges is pulled. Conversely, when the lid 4 is pushed onto the latch 5, the lid 4 is closed and its closed state is held by the latch 5 (latching).

The above-mentioned lid hinge 4*a* is formed at an end of an extended portion of the plastic part 4*c*, and is swingably attached to the front portion of the interior of the port accommodation recess 2. A catch 4*d* that is engageable with the latch 5 is also formed on the plastic part 4*c*. A detection tab 4*e* used for detecting an open/closed state of the lid 4 is also formed just below the catch 4*d* on the plastic part 4*c*. The detection tab 4*e* protrudes perpendicularly to the lid 4. The detection of the open/closed state of the lid 4 will be described later.

A charge port 3 is provided at the center of the port accommodation recess 2. Although there are various charging standards, a charging standard of the charge port 3 shown in FIG. 1 is CHAdeMO. However, the charging standard is not limited to the CHAdeMO. A plastic cap 6 for covering the charge port 3 is also provided. The cap 6 is attached on a front side of the charge port 3 via a cap hinge 6*a* to make it openable and closable. A lock 6*b* is also provided on a rear side of the charge port 3 to hold the closed cap 6. The central portion of the port accommodation recess 2 where the charge port 3 is disposed is formed as a deep recess portion, and the peripheral portion of the port accommodation recess 2 outside the deep recess portion is formed as a shallow recess portion.

A long hole 7 is formed just below the latch 5 in the port accommodation recess 2. This long hole 7 is formed to be associated with the above-mentioned detection tab 4*e* on the lid 4, and the detection tab 4*e* is inserted into the long hole 7 while the lid 4 is closed. A sensor 8 for detecting the open/closed state of the lid 4 is provided behind the long hole 7. The sensor 8 has a light-emitting element and a light-receiving element that are arranged oppositely to each other, and the detection tab 4*e* is positioned between the light-emitting element and the light-receiving element while the lid 4 is closed. Therefore, when a light from the light emitting element (which does not have to be visible light) is detected by the light receiving element, the lid 4 is open. On the other hand, when the light from the light emitting device cannot be detected by the light receiving device, the lid 4 is closed.

The plastic part 4*c* of the lid 4 has an outline shape approximately identical to an outline shape of the deep recess portion of the port accommodation recess 2, except for the above-mentioned extended portion at which the lid hinge 4*a* is formed. Therefore, when the lid 4 is closed, the plastic part 4*c* partially enters the deep recess portion of the port accommodation recess 2. In addition, the outer surface of the closed lid 4 is flush with the outer surface of the left front fender F. However, a slit 9 is formed between an outer circumferential edge of the closed lid 4 and the surface of the left front fender F (see FIG. 3 and FIG. 4). This slit 9 is an ordinary slit formed around a lid of a charge port or a refuel port.

A lamp 10 is provided between the rear portion in the port accommodation recess 2 (an outer circumference of the port accommodation recess 2), more specifically, between the slit 9 on the opposite side to the lid hinge 4*a* with respect to the charge port 3 and the latch 5. In more detail, the lamp 10 is provided between the slit 9 on the opposite side to the charge port 3 with respect to the latch (the outer circumference of the port accommodation recess 2) and the latch 5. The lamp 10 is disposed at a stepped portion located at a boundary between the deep recess portion and the shallow recess portion that are described above. The lamp is disposed in an immediate vicinity of a position that is operated by a user when opening the lid 4 and is not visible from an outside of the vehicle while the lid 4 is closed. Therefore, in a state where the lid 4 is closed, the light emitted from the lamp 10 is not emitted directly toward the outside. In the state where the lid 4 is closed, the light emitted from the lamp 10 is emitted toward the outside only as an indirect light.

Figure 4:
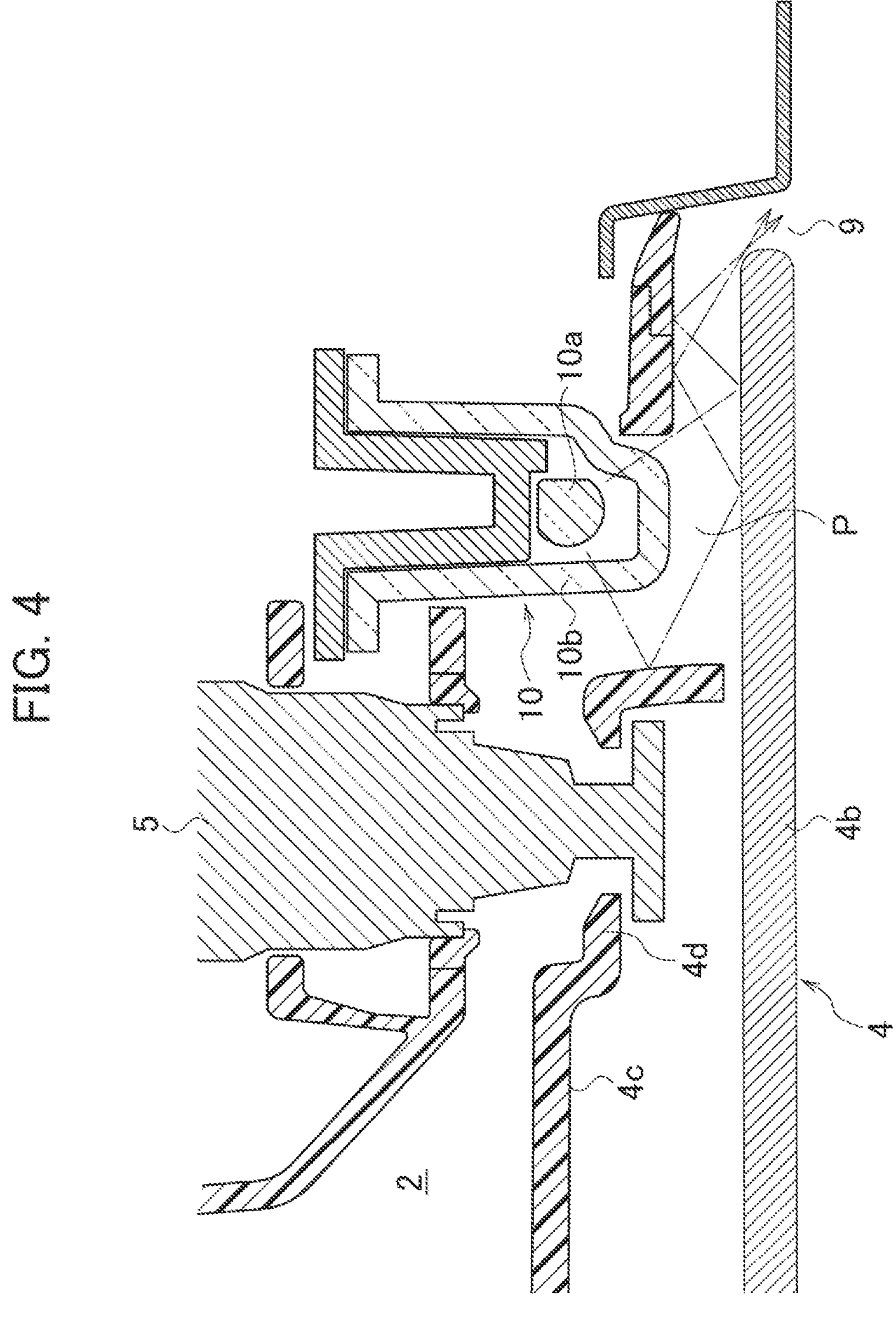
FIG. 4 It is an enlarged cross-sectional view of a vicinity of a latch and a lamp shown in FIG. 3.

As shown in FIG. 4, the lamp 10 has a light guide tube 10*a* and a transparent cover 10*b* disposed on an outer side of the light guide tube 10*a*. At one end of the light guide tube 10*a* (behind the plastic part 4*c* that constructs the port accommodation recess 2), a light source is located. The light source in the present embodiment is a high-intensity white LED (not shown in the drawings). The light from the light source is guided along the light guide tube 10*a* and then emitted outward through the cover 10*b*. The lamp 10 in the present embodiment is extended in a vertical direction. The cover 10*b* has two faces, one of which is faced toward the charge port 3, i.e., directed forward. The other is faced to a lateral side of the vehicle, i.e., toward a back face of the closed lid 4.

The lamp 10 has two functions. First, it illuminates the charge port 3 when the lid 4 is open to facilitate the connection of a charging cable (a charge gun 17*a*: see FIG. 5). Second, when the lid 4 is closed, it lights up and illuminates the slit 9 with the indirect light to make it easier to find the lid 4 from the outside and to open the lid 4. Light distribution patterns made on an inner surface of the cover 10*b* are formed to accomplish these two functions. In the state where the lid 4 is open, the light emitted from the lamp 10 directly illuminates the charge port 3 (or the cap 6 that covers the charge port 3). Note that, in the state where the lid 4 is open, the light emitted from the lamp 10 is reflected by the back face of the lid 4 and user's clothes to generate indirect light, and this indirect light also illuminates the charge port 3 (or the cap 6 that covers the charge port 3).

In the state where the lid 4 is closed, the light emitted from the lamp 10 is reflected by reflective surfaces such as the back face of the lid 4 and the inner surface of the port accommodation recess 2 as shown by single dotted lines in FIG. 4, and thereby emitted toward the outside through the slit 9 as the indirect light. (More specifically, the back face of the lid 4 is the back face of the outer panel 4*b* and the side face of the plastic parts 4*c*.) In other words, no light-shielding member such as a weather strip is provided between the port accommodation recess 2 and the lid 4, and thereby a light-guiding reflection path(s) P of the above-mentioned indirect light is formed. Therefore, the rear portion of the slit 9 is prominently illuminated by the indirect light at a dark place. As a result, a user can easily recognize the position (the rear portion of the lid 4) that must be operated for opening the lid 4. The indirect light illuminating the slit 9 does not have to be recognizable at a bright place. At such a bright place, an opening operation of the lid 4 can be easily done.

In addition, the slit 9 around the lid 4 does not have to be illuminated all the way around by the indirect light, and its rear side around the lid 4 is rather illuminated. Since the rear side around the lid 4 closer to the lamp 10 (and to the latch 5) is particularly illuminated brightly, it is easy to recognize the position that must be operated for opening the lid 4. If the slit 9 is evenly illuminated all around, it becomes difficult to recognize the operating position of the lid 4.

Figure 5:
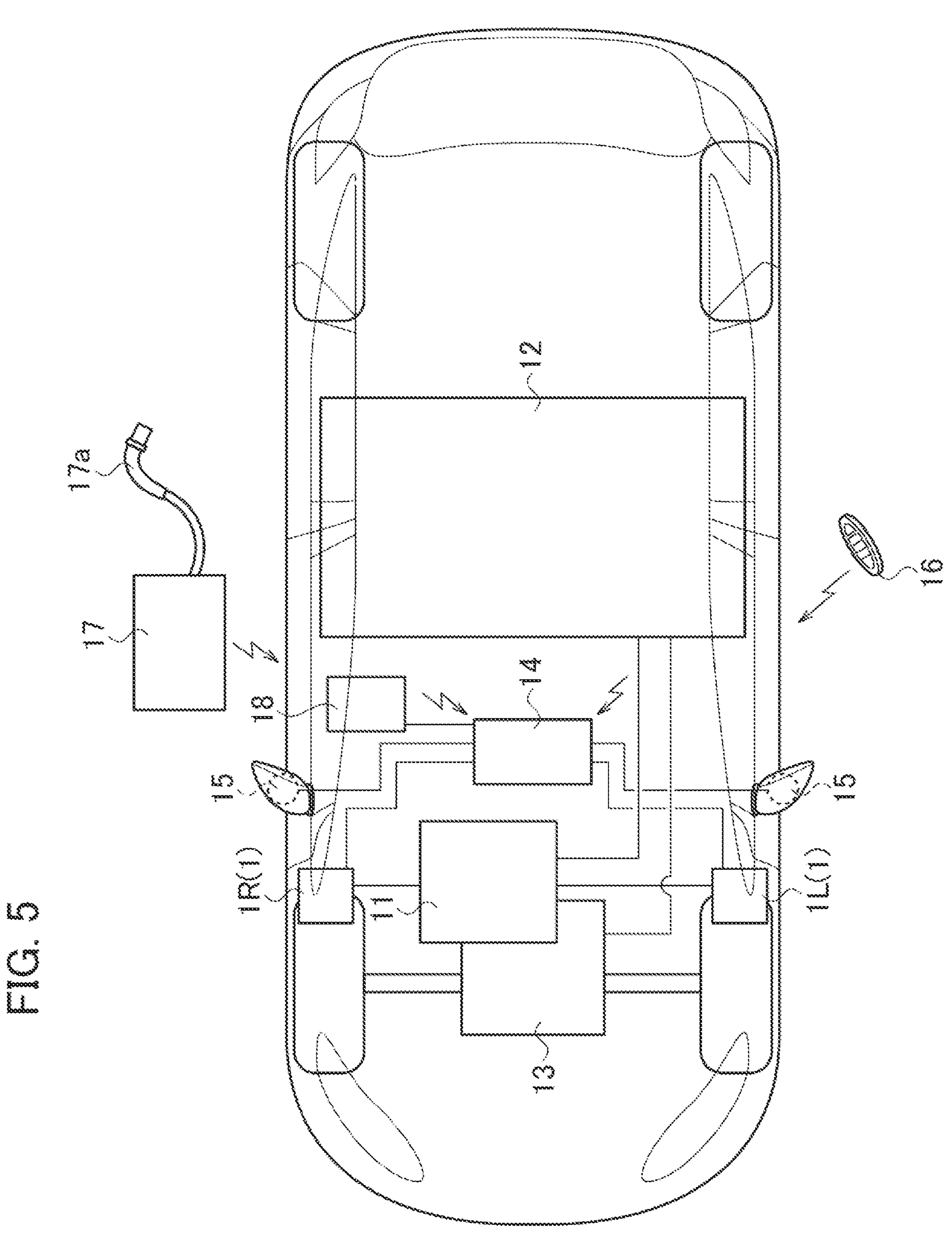
FIG. 5 It is a system configuration diagram of the charge port device.

The above describes the charge port device 1 (the first charge port device 1L) installed on the left front fender F. However, as shown in FIG. 5, the vehicle of the present embodiment is also equipped with a second charge port device 1R on a right front fender symmetrically to the first charge port device 1L. The first charge port device 1L and the second charge port device 1R are configured symmetrically with respect to a vertical plane containing a centerline of the vehicle, except that the charging standards of their charge ports 3 are different from each other. The charging standard of the first charge port device 1L is the CHAdeMO, but the charging standard of the second charge port device 1R is SAE J1772 Type 1, for example. The CHAdeMO is a DC charging standard that allows for quick charging. The SAE J1772 is an AC charging standard for normal charging.

The charge port devices 1 (1L and 1R) are connected to a battery 12 via an electricity control apparatus 11. Electric power supplied from outside through the charge port 3 of the charge port device 1 (1L or 1R) charges the battery 12 by the electricity control apparatus 11. In addition, the vehicle of the present embodiment can also supply electric power stored in the battery 12 externally through the electricity control apparatus 11, the charge port device 1 (1L or 1R) and the cable. The battery 12 is also connected to a powertrain apparatus 13 that includes a motor and so on. The powertrain apparatus 13 runs the vehicle with the electric power stored in the battery 12. The powertrain apparatus 13 can also generates regenerative electric power when the vehicle decelerates and then charge the battery 12 with the regenerative electric power.

The lamps 10 of the charge port device 1 (1L and 1R) are connected to a light controller 14. Turning on and off of the lamps 10 are controlled by the light controller 14. The light controller 14 also controls a so-called welcome lighting system. The welcome lighting system turns on front/rear lights, puddle lamps 15 provided at lower portions of door mirrors, lamps provided on inner sides of door handles, ambient light lamps in a passenger compartment and so on when a user approaches the vehicle to welcome the user. In the present embodiment, the lamps 10 of the charge port device 1 also function as part of the welcome lighting system.

The light controller 14 communicates wirelessly with a smart key 16 held by the user, so that it can detect the user's approach to the vehicle. The smart key 16 is also equipped with an unlock button for the latch 5 of the charge port device 1. The light controller 14 also receives an unlock signal sent from the smart key 16 when the unlock button for the latch 5 is pressed. In other words, the light controller 14 receives predetermined signals from the smart key 16, such as the user's approach signal and the unlock signal for the latch 5.

The light controller 14 also receives signals from a charging station 17. The charging station 17 sends information on a charging standard available at the charging station 17 as a signal. The charging station 17 is equipped with a charging cable with a charge gun 17*a* connected to its end. The light controller 14 is also connected to a navigation system 18 installed in the vehicle.

Hereinafter, it will be described how the lamp(s) 10 of the charge port device 1 is lit.

When the approach signal from the smart key 16 is detected by the light controller 14 (the user's approach is detected) or when the door unlock signal from the smart key 16 is detected by the light controller 14, the welcome lighting system is activated. In other words, the light controller 14 lights up the lamps 10 of the charge port devices 1 (both of the first charge port device 1L and the second charge port device 1R) together with the puddle lamps 15 and so on that are lit by the welcome lighting system. As a result, the slits 9 are illuminated by the indirect light, and thereby the user can easily recognize the operating position of the lid 4 at a dark place. If the user does not do any operation, the welcome lighting system is deactivated (the lamps 10 are also turned off) by a timer (e.g. 30 seconds) and the doors are also locked.

Also when it is detected based on the approach signal from the smart key 16 that the user have left the vehicle, the welcome lighting system is deactivated (the lamps 10 are also turned off) and the doors are also locked. If the door is opened, the user is assumed to get in the vehicle, and the welcome lighting system is deactivated (the lamps 10 are also turned off) by the timer (e.g., 3 minutes). Alternatively, if the user gets in the vehicle and its drive mode is set to a mode other than a parking mode by a selector switch, the welcome lighting system is also deactivated (the lamps 10 are also turned off).

When the user finishes driving the vehicle and the door is opened (after the drive mode is changed to the parking mode), the lamps 10 are lit up in preparation for charging. As a result, the slits 9 are illuminated by the indirect light, and the user can easily recognize the operating position of the lid 4 at a dark place. After the door is opened and the lamps 10 are lit up, the lamp 10 is turned off when the door lock signal or the user's leave is detected. On the other hand, if the lid 4 is opened, the lamp 10 will be turned off when it is closed later. When the charging cable is connected to the charge port 3 and charging is started, the lamp 10 is turned off by the timer (e.g. 3 minutes).

Here, when one of the lids 4 of the two charge port devices 1 (1L and 1R) is opened, the lamp 10 of the other is turned off. In addition, the lamp 10 may be turned on, turned off or flashing depending on a charging state during charging, instead of being turned off. The light color of the lamp 10 may be changed to a color other than white (e.g., green, yellow, orange) in order to indicate the charging state. In a case where the lamp 10 is lit or flashed during charging, the lamp 10 will be turned off when the lid 4 is closed after charging is completed. Although the example done after the vehicle has been driven is explained, it is similarly done when a user approaches the vehicle not to drive it but only to charge it. That is, in such a case, the lamps 10 are turned on when the user approaches or the door unlock signal is detected. Subsequent control of the lamps 10 are the same as the control during charging described above. Note that, if the light controller 14 detects the press of the unlock button for the latch 5 of the smart key 16 while the lamp 10 is turned off, the lamp 10 will be turned on.

A case where the lamp 10 is turned on in conjunction with the charging station 17 will be described below. When the vehicle approaches the charging station 17, the light controller 14 wirelessly receives the charging standard information sent from the charging station 17 as a signal. Then, after receiving the signal, the light controller 14 turns on the lamp 10 of one of the two charge port devices 1 (1L and 1R) that matches the charge standard information. The lamp 10 of the other charge port device 1, which does not match the charging standard information, remains off. This makes it easy for the user to know which of the two charge port devices 1 to operate. Note that there may be a case where the charging station 17 supports two charging standards, i.e., it has two types of charge guns 17*a*. If the two charging standards of the charging station 17 match the charging standards of the two charge port devices 1 (1L and 1R), respectively, the light controller 14 controls the two lamps 10 of the charge port devices 1 (1L and 1R) simultaneously. The user can select the desired charge port device 1 (1L or 1R) to charge.

In the example described above, the light controller 14 gets the charging standard information from the charging station 17 in a non-contact manner. The light controller 14 can also get the charging standard information in a different way. When the vehicle has the navigation system 18, the navigation system 18 stores the charging standard of the charging station 17 together with location information of the charging station 17. The navigation system 18 detects the location of the vehicle using the GPS and so on, and can provide the charging standard information of the charging station 17 to the light controller 14 based on the location information of the charging station 17. In this case, there is no need to communicate with the charging station 17 (although the navigation system 18 uses the GPS system), and the vehicle can get the charging standard information by itself. Then, in the same way, the lamp 10 of only one of the two charge port devices 1 (1L and 1R), which matches the charging standard information, is controlled (turned on).

According to the present embodiment, the latch 5 is provided in the port accommodation recess 2 on the opposite side of the lid hinge 4*a* with respect to the charge port 3. The lamp 10 is provided in the port accommodation recess 2 at a position that is located between the latch 5 and the slit 9 on the opposite side of the lid hinge 4*a* with respect to the charge port 3 and is not visible from the outside while the lid 4 is closed. In addition, the light guide reflection path(s) P is formed to guide the light emitted from the lamp 10 toward the slit 9 as the indirect light by reflecting the light while the lid 4 is closed. Therefore, even if the lid 4 is closed at a dark place, the position of the lid 4 (the charge port 3) can be easily recognized by the indirect light guided along the light guide reflection path P. In particular, it is easy to open the lid 4 because the indirect light illuminates the operating position of the lid 4 most brightly. In addition, since the charge port 3 (or the cap 6) is illuminated by the direct light from the lamp 10 after the lid 4 is opened, it becomes possible to connect the charge gun 17*a* to the charge port 3 easily.

In the present embodiment, the cap 6 is also provided for the charge port 3 in the port accommodation recess 2. Therefore, even if rain water enters the port accommodation recess 2 through the slit 9, the water is prevented from entering the charge port 3. Furthermore, the cap hinge 6*a* is disposed on the same side as the lid hinge 4*a* with respect to the charge port 3. Therefore, the cap 6 that is being opened does not block the direct light from the lamp 10, and the charge gun 17*a* can be easily connected to the charge port 3.

Also, in the present embodiment, the light controller 14 that controls the lamp(s) 10 turns on the lamp 10 when it receives a predetermined signal from the smart key 16 (the approach signal, the door unlock signal, the unlock signal for the lid 4 and so on). Therefore, no operation is needed to be done in the passenger compartment in order to find the lid 4, and thereby the user can find the location of the lid 4 (the charge port 3) more easily. It is very user-friendly to easily find the lid 4 (the charge port 3) at a dark place or in rainy weather.

In addition, the two charge port devices 1 (the first charge port device 1L and the second charge port device 1R) are provided in the present embodiment. Both of the lamps 10 are turned on when a predetermined condition is satisfied, but, when any one of them is opened, the other of the lamps 10 is turned off. Thus, unnecessary electric power consumption can be suppressed.

Furthermore, the two charge port devices 1 (the first charge port device 1L and the second charge port device 1R) that respectively have different charging standards are provided in the present embodiment. Only the lamp 10 of the first charge port device 1L and the second charge port device 1R, which matches the charging standard information of the charging station 17 near the vehicle, is turned on. Therefore, the user can easily recognize the charge port 3 (the first charge port device 1L or the second charge port device 1R) of the charging standard to be used.

Here, if the charging standard information is received contactlessly from the charging station 17, the charging standard information can be recognized reliably. On the other hand, if the charging standard information is got from the navigation system 18 installed in the vehicle based on the current position of the vehicle, the vehicle can get the charging standard of the nearby charging stations 17 by itself.

The present invention is not limited to the embodiment described above. For example, in the above embodiment, the sensor 8 optically detects the opening and closing of the lid 4, but a sensor that magnetically or electrically detects the opening and closing may be also used. In the above embodiment, the lid 4 is locked by the latch 5, but a locking mechanism may be provided separately from the latch 5. In addition, if no electric power is supplied externally from the charge port 3, the lid 4 does not have to be locked (only latched and unlatched). The charging standards of the two charge port devices 1L and 1R are not limited to the charging standards in the above embodiment as long as they are different from each other. The two charge port devices 1L and 1R are provided in the above embodiment, but only a single charge port may be provided. Furthermore, two (or more) charge ports 3 may be provided in a single charge port device 1 (i.e., in a single port accommodation recess 2).

In the above embodiment, the lamp 10 has the light source, the light guide tube 10*a* and the cover 10*b*. However, the lamp 10 may be configured of only the light source, or configured of only the light source and the cover. In addition, the cover 10*b* may be a translucent white or milky white part that diffuses the light, instead of the transparent part having the light distribution pattern. A switch for arbitrarily turning on the lamp 10 may be provided in the passenger compartment or in the port accommodation recess 2. The light controller 14 may be integrated with other equipment controllers.

REFERENCE SIGNS LIST

1 charge port device
1L first charge port device
1R second charge port device
2 port accommodation recess
3 charge port
4 lid
4*a* lid hinge
5 latch
6 cap
6*a* cap hinge
8 sensor (for open/close of the lid)
9 slit
10 lamp
14 light controller
16 smart key
17 charging station
18 navigation system
P light-guiding reflection path

The invention claimed is:

1. A charge port device for a vehicle, the device comprising:

a port accommodation recess formed on a surface of a vehicle body of the vehicle;

a charge port provided in the port accommodation recess;

a lid attached to the vehicle body for concealing the port accommodation recess;

a lid hinge attached to the vehicle body for supporting the lid to be openable and closable;

a latch provided in the port accommodation recess on an opposite side to the lid hinge with respect to the charge port for keeping a closed state of the lid;

a slit formed between the surface of the vehicle body and an outer circumferential edge of the lid while the lid is closed;

a charge port illuminating lamp comprising a light guide tube and a cover, the charge port illuminating lamp being provided at a position in the port accommodation recess between the latch and the slit on an opposite side to the lid hinge to illuminate the charge port, the position being not visible from an outside of the vehicle while the lid is closed; and a light-guiding reflection path that guides a light emitted from the light guide tube and the cover of the charge port illuminating lamp toward the slit as an indirect light by reflecting the light while the lid is closed, wherein a back face of the lid is included in the light-guiding reflection path;

wherein the cover is configured to diffuse the light, and wherein the charge port illuminating lamp is configured to illuminate the charge port with a direct light when the lid is opened.

2. The charge port device according to claim 1, further comprising:

a cap for covering the charge port and a cap hinge for supporting the cap to be openable and closable in the port accommodation recess, wherein the cap hinge is disposed on the same side as the lid hinge with respect to the charge port.

3. The charge port device according to claim 1, further comprising a controller for controlling the charge port illuminating lamp, wherein the controller turns on the charge port illuminating lamp when receiving a predetermined signal from a smart key of the vehicle.

4. The charge port device according to claim 1, further comprising a controller for controlling the charge port illuminating lamp; and a sensor for detecting an open/closed state of the lid, wherein the charge port device comprises a first charge port device and a second charge port device, wherein the controller is configured to turn on both of the charge port illuminating lamps of the first charge port device and the second charge port device when a predetermined condition is satisfied, and then, when the sensor of one of the first charge port device and the second charge port device detects opening of the lid of the one of the first charge port device and the second charge port device, turn off the charge port illuminating lamp of the other of the first charge port device and the second charge port device.

5. The charge port device according to claim 1, further comprising a controller for controlling the charge port illuminating lamp, wherein the charge port device comprises a first charge port device and a second charge port device that have different charging standards, wherein the controller is configured to get charging standard information from a charging station near the vehicle, and then turn on only the charge port illuminating lamp of one of the first charge port device and a second charge port device, which matches the charging standard information that is received.

6. The charge port device according to claim 5, wherein the controller is configured to get the charging standard information contactlessly from the charging station.

7. The charge port device according to claim 6, wherein the controller is configured to get the charging standard information from a navigation system installed on the vehicle based on a current position of the vehicle.

* * * * *